United States Patent
An et al.

(10) Patent No.: US 7,042,553 B2
(45) Date of Patent: May 9, 2006

(54) APPARATUS FOR CONVEYING SUBSTRATES

(75) Inventors: Geun-soo An, Cheonan-si (KR); Gi-cheon Yoon, Seongnam-si (KR)

(73) Assignee: Samsung Electronics Co., Ltd., (KR)

( * ) Notice: Subject to any disclaimer, the term of this patent is extended or adjusted under 35 U.S.C. 154(b) by 33 days.

(21) Appl. No.: 10/861,006

(22) Filed: Jun. 4, 2004

(65) Prior Publication Data

US 2005/0073667 A1    Apr. 7, 2005

(30) Foreign Application Priority Data

Oct. 1, 2003    (KR) ............ 10-2003-0068367

(51) Int. Cl.
- *G03B 27/58* (2006.01)
- *G03D 5/00* (2006.01)
- *B65H 1/00* (2006.01)
- *B65G 49/07* (2006.01)

(52) U.S. Cl. ............ 355/72; 396/611; 414/222.01; 414/937; 414/940

(58) Field of Classification Search ............ 355/53, 355/72; 414/217, 222.01, 935, 937, 940, 414/941; 396/611
See application file for complete search history.

(56) References Cited

U.S. PATENT DOCUMENTS

| | | | | |
|---|---|---|---|---|
| 5,980,183 A | * | 11/1999 | Fosnight | 414/222.01 |
| 5,993,081 A | * | 11/1999 | Itoh et al. | 396/611 |
| 6,822,730 B1 | * | 11/2004 | Krikhaar et al. | 355/72 |
| 2004/0141831 A1 | * | 7/2004 | Gilchrist et al. | 414/217 |
| 2005/0158152 A1 | * | 7/2005 | Otaguro | 414/217 |

* cited by examiner

*Primary Examiner*—Alan Mathews
(74) *Attorney, Agent, or Firm*—Cantor Colburn LLP

(57) ABSTRACT

Disclosed herein is an apparatus for conveying substrates, which is capable of efficiently conveying large substrates and has a function to temporarily store the substrate in a buffer unit. The apparatus includes a substrate support unit, a conveying unit, and the buffer unit. The substrate support unit supports the substrate thereon. The conveying unit sequentially conveys the substrate support unit to a plurality of processing units. The buffer unit is provided at a predetermined portion of the conveying unit to move the substrate support unit upward away from the conveying unit in a vertical direction, thus temporarily storing the substrate support unit therein while spacing the substrate support unit apart from the conveying unit. The substrate conveying apparatus thus efficiently conveys the substrates, regardless of sizes of the substrates, while temporarily storing the substrates to buffer a difference in the processing time.

18 Claims, 4 Drawing Sheets

APPARATUS FOR CONVEYING SUBSTRATES

BACKGROUND OF THE INVENTION

This application claims priority of Korean Patent Application No. 10-2003-0068367 filed on Oct. 1, 2003 in the Korean Intellectual Property Office, the disclosure of which is incorporated herein in its entirety by reference.

1. Field of the Invention

The present invention relates generally to an apparatus for conveying substrates, and more particularly to an apparatus which supports a substrate on a substrate supporting unit and conveys the substrate supporting unit by use of rollers.

2. Description of the Related Art

Substrates have been applied to various products, for example, Flat Panel Displays (FPDs) such as Liquid Crystal Displays (LCDs) and Plasma Display Panels (PDPs). Because these products are manufactured through a plurality of processes, each of the substrates must be conveyed to desired processing units for required processes. In order to convey the substrate to the processing units, there have been proposed a variety of substrate conveying apparatuses.

Generally, in a substrate processing system, a plurality of processing units which perform a coating process, a developing process, and an etching process, respectively, are installed at predetermined positions of a substrate conveying apparatus. Of the conventional substrate conveying apparatuses, there has been used an unmanned conveying vehicle called an automatic guided vehicle (AGV). The AGV loaded with a substrate cassette which contains about twenty substrates travels between the processing units. Because a conventional LCD glass substrate is small, ranging from 300 mm$^2$ to 500 mm$^2$, several sheets of LCD glass substrates may be contained in one substrate cassette and conveyed to the plurality of processing units using the AGV.

However, there is a growing tendency that the LCD glass substrates have increased in size. Recently, the LCD glass substrates having surface areas of 1 m$^2$ or larger have been used. When the large LCD glass substrate is contained in the cassette, the substrate may be undesirably bent. Therefore, the conventional AGV has been restricted in conveying the cassette containing the large and heavy substrate.

The conventional AGV has another problem since the AGV is very expensive, for which the number of the AGVs provided on one substrate processing system is restricted, thus deteriorating an operational efficiency while processing the substrates.

Further, among the conventional substrate conveying apparatuses, there are a roller conveyor and an air cushion conveyor. The roller conveyor conveys the substrates one at a time. The air cushion conveyor conveys the substrates using pneumatic force and rollers. However, the conventional roller conveyor and the conventional air cushion conveyor have problems in that the substrates continuously contact the rollers while the substrates are being conveyed, thus impurities may contaminate contact parts of the substrates on which the substrates contact the rollers, and a contact stress may occur on the contact parts of the substrates.

Further, when each of the substrates is conveyed to the processing units to go through a required process, by the conveying apparatus, the conveyance of the substrate may be delayed because there is a difference in the processing time according to a kind of process which is performed on the substrate or a kind of substrate. To buffer the difference in the processing time, another type of substrate processing system which collaterally has a buffer function to temporarily store the substrate has been proposed. In order to add such a buffer function to the substrate processing system, various methods have been used. Among these methods, there is a method of temporarily stopping the substrate conveying apparatus. However, the method of stopping the substrate conveying apparatus to provide the buffer function has a problem in that a throughput is undesirably reduced.

SUMMARY OF THE INVENTION

Accordingly, the present invention has been made keeping in mind the above problems occurring in the prior art, and an aspect of the present invention is to provide a substrate conveying apparatus, which is capable of efficiently conveying substrates, regardless of sizes of the substrates.

Another aspect of the present invention is to provide a substrate conveying apparatus, which has a buffer function to temporarily store the substrate, thus buffering a difference in the processing time without affecting the throughput.

According to an exemplary embodiment of the present invention, there is provided a substrate conveying apparatus, including a substrate support unit which supports a substrate thereon, a conveying unit which sequentially conveys the substrate support unit to a plurality of processing units, and a buffer unit which is provided at a predetermined portion of the conveying unit to move the substrate support unit upward away from the conveying unit in a vertical direction, thus temporarily storing the substrate support unit therein while spacing the substrate support unit apart from the conveying unit, and thereby buffering a difference in the processing time.

Preferably, the substrate support unit may include a substrate support part and a body part. The substrate support part may comprise a plurality of projections to support a lower surface of the substrate thereon. The body part prevents a movement of the substrate from the substrate support unit, and supports thereon another substrate support unit when a plurality of substrate support units are sequentially stored in the buffer unit.

Preferably, the buffer unit may move the substrate support unit upward away from the conveying unit in the vertical direction using a cylindrical actuator.

BRIEF DESCRIPTION OF THE DRAWINGS

The above and other aspects, features and other advantages of the present invention will be more clearly understood from the following detailed description taken in conjunction with the accompanying drawings, in which:

FIGS. 2 and 3 are views illustrating a substrate supporting unit included in the apparatus of FIG. 1, in which FIG. 2 is a perspective view of the substrate supporting unit, and FIG. 3 is a sectional view of the substrate supporting unit;

DESCRIPTION OF THE EXEMPLARY EMBODIMENT

Figure 1:
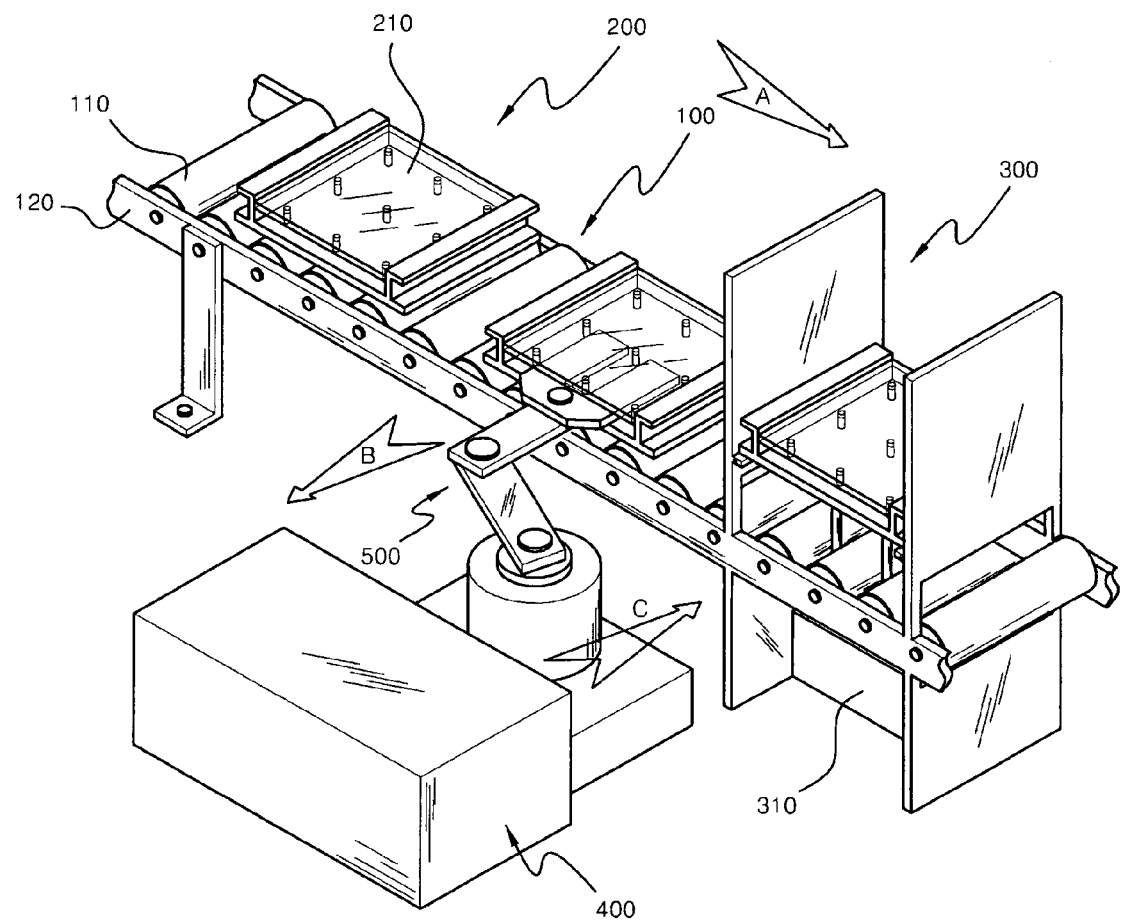
FIG. 1 is a schematic view illustrating an apparatus for conveying substrates according to an exemplary embodiment of the present invention.

Hereinafter, an exemplary embodiment of the present invention will be described in detail with reference to the attached drawings. Reference now should be made to the drawings, in which the same reference numerals are used throughout the different drawings to designate the same or similar components.

The present invention will be described with reference to FIG. 1. FIG. 1 is a schematic view illustrating an apparatus for conveying substrates according to an exemplary embodiment of the present invention.

As shown in FIG. 1, the substrate conveying apparatus includes a conveying unit 100, a plurality of substrate support units 200, and a buffer unit 300. The conveying unit 100 sequentially conveys a plurality of substrates 210 in a direction indicated by an arrow A in FIG. 1. Each of the substrate support units 200 supports one substrate 210 thereon, and is conveyed along a guide path of the conveying unit 100 along with the substrate 210 loaded thereon. The buffer unit 300 is provided at a predetermined portion of the guide path to move the substrate supporting unit 200 upward away from the conveying unit 100 in a vertical direction, thus temporarily storing the substrate supporting unit 200 therein while spacing the substrate support unit 200 apart from the conveying unit 100, and thereby buffering a difference in the processing time.

Referring to FIG. 1, the plurality of substrates 210 to be processed are respectively loaded into the substrate supporting units 200, and then carried into the substrate conveying apparatus from an outside one after another. Each of the substrate supporting units 200 into which the substrates 210 are respectively loaded moves along the guide path of the conveying unit 100, thus sequentially arriving at positions where a plurality of processing units 400 to perform a coating process, a developing process, an etching process, etc., respectively are placed. At this time, a robot arm 500 of each of the processing units 400 removes the subsfrate 210 from the substrate supporting unit 200 which has arrived at the processing unit 400, and subsequently carries the substrate 210 to the processing unit 400. The buffer unit 300 is provided on the predetermined portion of the guide path of the conveying unit 100. In order to buffer a difference in the processing time, the substrate support unit 200 having the substrate 210 may be spaced apart from the conveying unit 100 to be temporarily stored. In this case, the buffer unit 300 moves the substrate support unit 200 in which the substrate 210 is loaded, upward away from the conveying unit 100 in a vertical direction, thus temporally storing the substrate supporting unit 200. The construction of the conveying unit 100, the substrate support units 200, and the buffer unit 300 will be described in detail in the following.

As shown in FIG. 1, the conveying unit 100 includes a plurality of conveyor rollers 110 which support the substrate supporting units 200 thereon. Each of the conveyor rollers 110 is supported at opposite ends thereof by two roller supporting parts 120, respectively. Each of the conveyor rollers 110 further has a drive unit (not shown), thus being independently driven. As the plurality of conveyor rollers 110 rotate clockwise in FIG. 1 at the same speed, the conveying unit 100 supports and conveys the plurality of substrate supporting units 200 in each of which one substrate 210 is loaded, in the direction A of FIG. 1. Because a conventional drive unit may be used as the drive unit to drive each of the conveyor rollers 110, the drive unit will not be described herein in detail.

Figure 2:
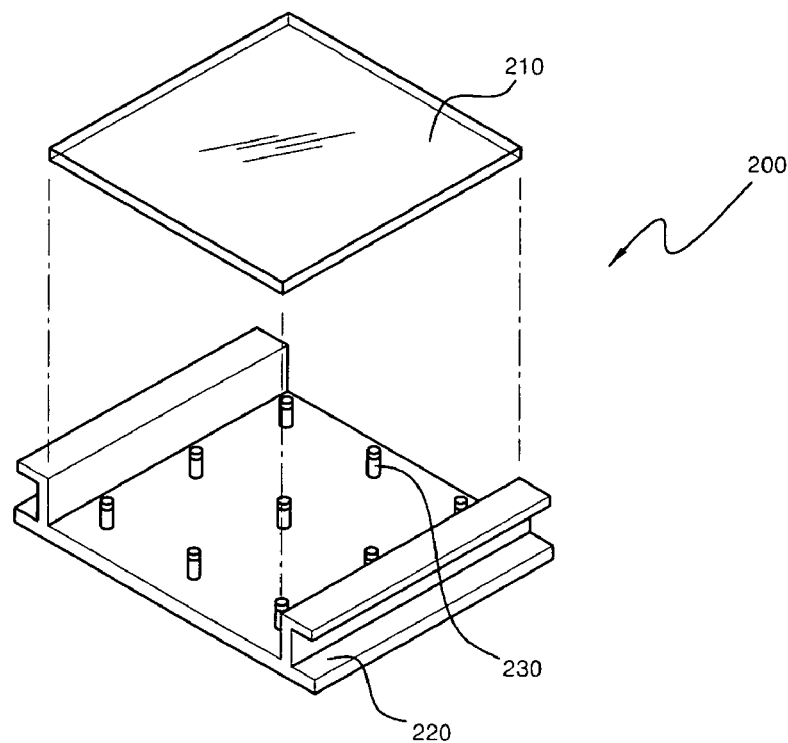
Figure 3:
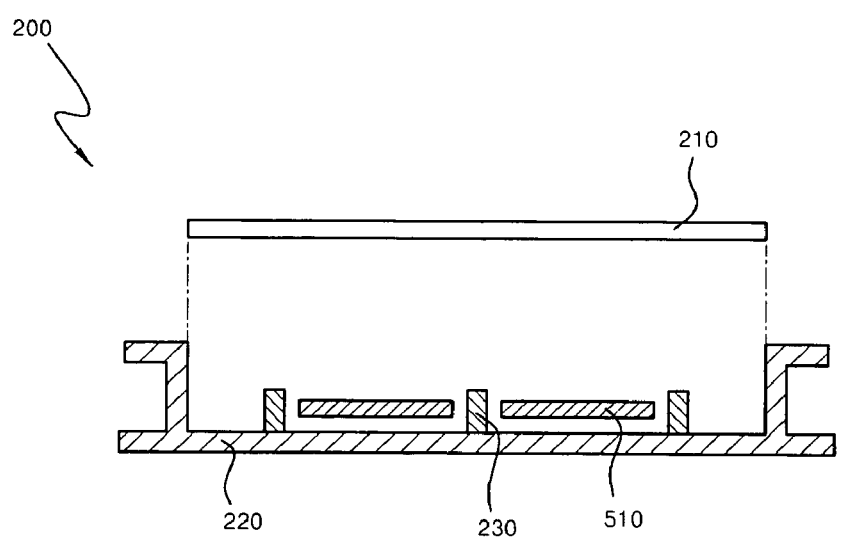

FIGS. 2 and 3 show each of the substrate supporting units 200 according to an exemplary embodiment of the present invention, in which FIG. 2 is a perspective view of the substrate supporting unit 200, and FIG. 3 is a sectional view of the substrate supporting unit 200. The construction of the substrate support units 200 will be described in detail with reference to FIGS. 2 and 3.

As shown in FIG. 2, each of the substrate supporting units 200 includes a body part 220 and a substrate supporting part 230. The body part 220 prevents an undesired movement of the substrate 210 from the substrate supporting unit 200. The body part 220 has, at both ends thereof, holding racks, so that several substrate supporting units 200 can be easily stacked in the vertical direction. The substrate supporting part 230 comprises a plurality of projections to support a lower surface of the substrate 210 thereon.

As shown in FIG. 3, the body part 220 stops both edges of the substrate 210 so that the substrate 210 does not move horizontally, and thus, the substrate 210 is prevented from being undesirably removed from the conveying unit 100. Further, the body part 220 has, at both ends thereof, the holding racks, thus allowing one substrate supporting unit 200 to be easily superposed on another substrate supporting unit 200 when several substrate supporting units 200 are stacked in the vertical direction. Because the body part 220 moves while being in contact with the conveyor rollers 110 of the conveying unit 100, the body part 220 must be made of very strong material which rarely deforms and does not produce foreign particles, even when an external shock is applied to the body part 220. For example, the body part 220 may be made of aluminum or stainless steel having a high strength.

The substrate supporting part 230 comprises the plurality of projections to support the lower surface of the substrate 210 thereon. The substrate supporting part 230 evenly supports the entire area of the lower surface of the substrate 210, thus minimizing a sag of the substrate 210 even though the substrate 210 has a large size. Further, the substrate supporting part 230 spaces the substrate 210 upward apart from a bottom of the body part 220 by a predetermined interval, thus allowing the substrate 210 to be easily raised by a fork 510 of the robot arm 500. The fork 510 of the robot arm 500 is inserted into a space which is defined between the substrate 210 and the bottom of the body part 220 by the substrate supporting part 230, and raises the substrate 210. Since the substrate supporting part 230 directly contacts the substrate 210, the substrate supporting part 230 is preferably made of a plastic material which has a high abrasion resistance and a high heat resistance under a wide range of pressures, conveying speeds, temperatures, reverse roughness, etc., and an excellent resistance to various chemical factors under high temperatures. For example, it is preferable that the substrate supporting part 230 is made of polyetheretherketon (PEEK) resin or polycarbon resin. According to the embodiment shown in FIG. 2, the substrate supporting part 230 comprises nine support pins. However, the substrate supporting part 230 may have other structures, without being limited to the embodiment of the FIG. 2.

Figure 4:
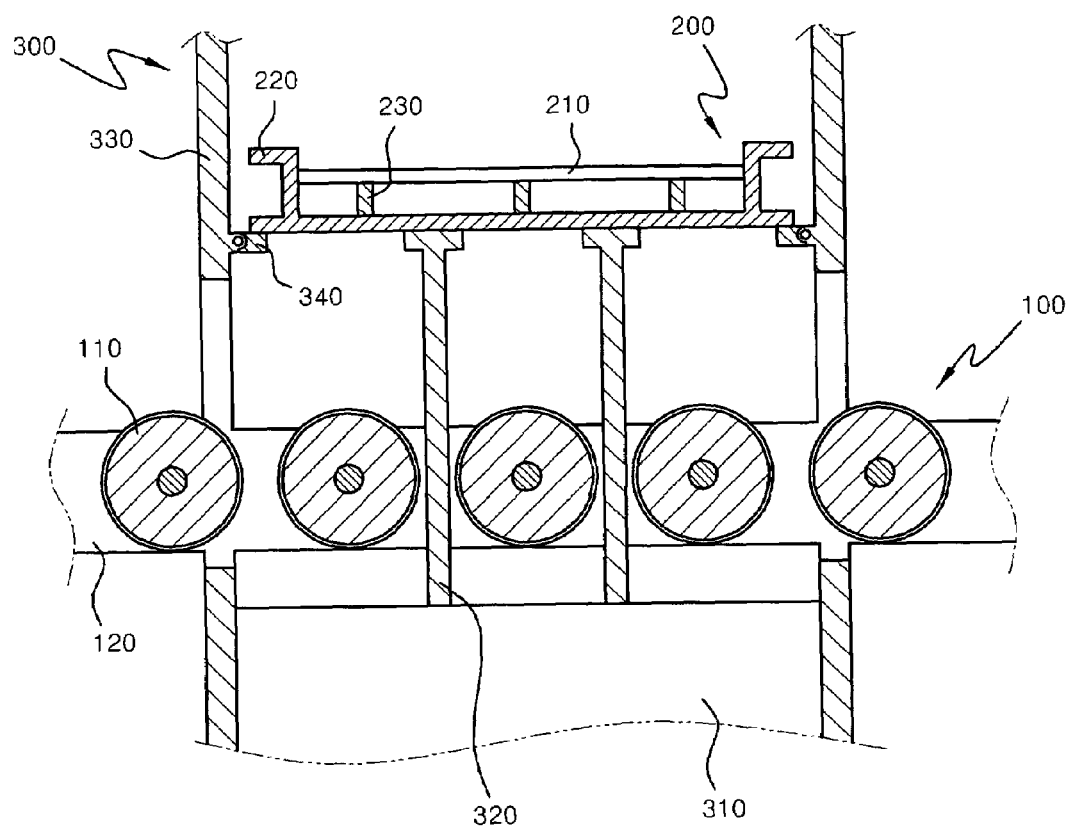
FIG. 4 is a sectional view of a buffer unit included in the apparatus of FIG. 1.

FIG. 4 is a sectional view of the buffer unit 300 according to an exemplary embodiment of the present invention.

As shown in FIG. 4, the buffer unit 300 moves the substrate supporting unit 200 upward away from the conveying unit 100, thus spacing the substrate support unit 200 apart from the conveying unit 100 to temporarily store the substrate supporting unit 200. In order to buffer the difference in the processing time, the buffer unit 300 moves the substrate supporting unit 200 which supports the substrate 210 thereon, upward away from the conveying unit 100 in the vertical direction, thus temporarily storing the substrate support unit 200 in a predetermined storage space of the buffer unit 300.

As shown in FIG. 4, the buffer unit 300 includes a motor 310, two actuators 320, a storage part 330, and two hinged supports 340. The buffer unit 300 is operated to move the substrate supporting unit 200 upward away from the conveying unit 100 in the vertical direction.

In the buffer unit 300 are installed the two actuators 320 and the motor 310. When one substrate supporting unit 200 enters the buffer unit 300 while being carried by the conveying unit 100, some conveyor rollers 110 placed within the buffer unit 300 stop rotating. Thus, the substrate supporting unit 200 in the buffer unit 300 is stopped, and then moved upward in the vertical direction by the actuators 320 which support the lower surface of the substrate support unit 200 thereon and is driven by the motor 310. That is, the actuators 320 move upward to push up the substrate supporting unit 200, thus moving the substrate supporting unit 200 away from the conveying unit 100 in the vertical direction.

When the substrate supporting unit 200 moves in the vertical direction by the actuators 320, the hinged supports 340 rotate upward so that the substrate supporting unit 200 passes over the hinged supports 340 to be placed in the storage part 330 which is provided on an upper portion of the buffer unit 300. Subsequently, the hinged supports 340 rotate downward to original states thereof. Each of the hinged supports 340 may comprise a pneumatic pump or a guide spring.

After the hinged supports 340 rotate to their original states, the actuators 320 move downward to their original positions below the conveyor rollers 110 of the conveying unit 100 by the drive of the motor 310. Therefore, the substrate supporting unit 200 is stored in the storage part 330 of the buffer unit 300 while being seated on the hinged supports 340. In this way, the other substrate supporting units 200 may smoothly move along the conveying unit 100 while passing through the buffer unit 300.

According to the exemplary embodiment of the present invention, the actuators 320 have two in number and are cylindrical in cross-section. However, the actuators 320 may have another cross-section. In other words, the actuators 320 may have circular, oval, polygonal, and other cross-sections. Further, the number of the actuators 320 may be one, two or more.

The substrate supporting unit 200 which supports the substrate 210 may be temporarily stored in the buffer unit 300 or continuously move along the conveying unit 100 while passing the buffer unit 300, according to the process which is performed on the substrate 210 by the processing unit 400. To describe in more detail, when it is required to buffer a difference in the processing time of the processing unit 400, according to the process which is performed on the substrate 210 by the processing unit 400, the substrate supporting unit 200 is moved upward by the actuators 320, and then temporarily stored in the storage part 330.

The case of storing one substrate support unit 200 in the buffer unit 300 to buffer the processing time difference, will be described with reference to FIG. 1. That is, when a substrate supporting unit 200 in which one substrate 210 is loaded, has been stored in the buffer unit 300, the robot arm 500 removes the substrate 210 from another substrate support unit 200 which is placed at a position adjacent to the processing unit 400, and then puts the substrate 210 in the processing unit 400 in the direction B of FIG. 1. After the predetermined process is performed on the substrate 210 by the processing unit 400, the substrate 210 is returned to the substrate support unit 200 in the direction C of FIG. 1. In this case, according to the process which is executed by the processing unit 400, the substrate supporting unit 200 may be stopped on the conveying unit 100 or may move along the conveying unit 100 without stopping, during the process of the processing unit 400.

When a substrate 210 is loaded in the substrate supporting unit 200 which is stored in the storage part 330 of the buffer unit 300, the robot arm 500 removes the substrate 210 from the substrate supporting unit 200 stored in the storage part 330, and then puts the substrate 210 in the processing unit 400. After a predetermined process is performed on the substrate 210 by the processing unit 400, the substrate 210 is returned to the substrate supporting unit 200. When the predetermined process is performed on the substrate 210 which has been placed in the storage part 330, by the processing unit 400, the actuators 320 move up in the vertical direction by the drive of the motor 310. At this time, the hinged supports 340 are open at an appropriate time, and the actuators 320 move down in the vertical direction while supporting the lower surface of the substrate supporting unit 200 thereon. Thereafter, the substrate supporting unit 200 contacts the conveyor rollers 110 of the conveying unit 100, and moves along the conveying unit 100.

As shown in FIGS. 1 and 3, when the substrate 210 is supported on the substrate supporting unit 200, a gap is defined between the substrate 210 and the bottom of the body part 220 of the substrate support unit 200. The robot arm 500 mounted to the processing unit 400 inserts the fork 510 thereof into the gap to carry the substrate 210 to the processing unit 400.

The processing units 400 which are installed in the substrate processing system and used together with the substrate conveying unit according to the exemplary embodiment of the present invention, comprise a cleaning unit, coating and developing units, a light exposure unit, an etching unit, a layering unit, an ion injection unit, etc., which are generally referred to as the processing units. Since the processing units 400 are same as conventional processing units in general construction and function, the processing units 400 will not be described herein in detail.

Figure 5:
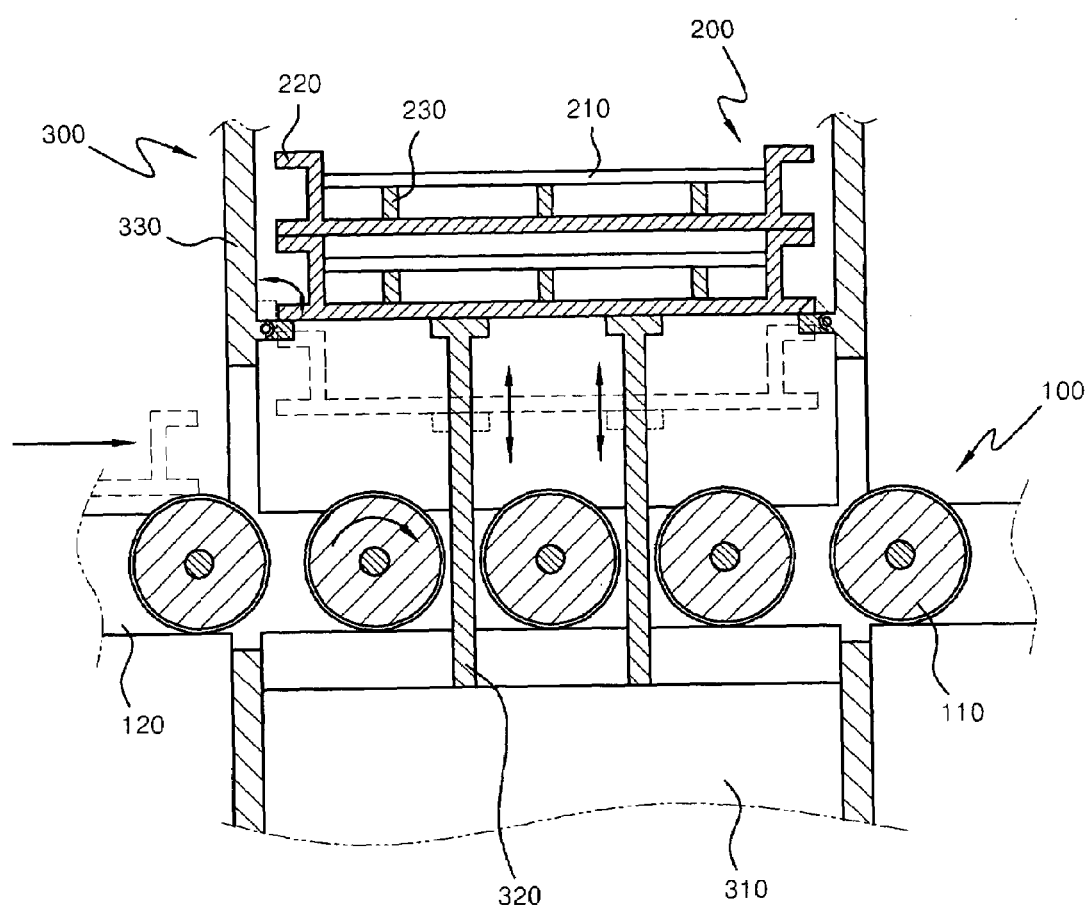
FIG. 5 is a sectional view illustrating an operation to temporarily store a plurality of substrate supporting units in the buffer unit of FIG. 4.

FIG. 5 is a view to show an operation to store two or more substrate supporting units 200 in the buffer unit 300. By the vertical movement of the actuators 320 and the selective opening of the hinged supports 340, the substrate supporting units 200 are sequentially stored in the storage part 330. That is, FIG. 5 shows an operation to put a substrate supporting unit 200 in the storage part 330 of the buffer unit 300 when another substrate supporting unit 200 has been stored in the storage part 330.

As described above, the present invention provides an apparatus for conveying substrates, which is capable of efficiently conveying large substrates, and which has a buffer unit at a predetermined portion on a guide path of a conveying unit, thus providing a buffer function without an additional capital investment, and without affecting a throughput.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for conveying substrates, comprising:
a substrate supporting unit to support a substrate thereon;
a conveying unit to sequentially convey the substrate supporting unit to a plurality of processing units; and
a buffer unit provided at a predetermined portion of the conveying unit to move the substrate supporting unit upward away from the conveying unit in the vertical direction, thus storing the substrate supporting unit therein while spacing the substrate supporting unit apart from the conveying unit;
wherein substrate supporting unit comprises:
a substrate supporting part comprising a plurality of projections to support a lower surface of the substrate thereon; and
a body part to prevent movement of the substrate from the substrate supporting unit, and to support thereon another substrate supporting unit when a plurality of substrate supporting units are sequentially stored in the buffer unit.

2. The apparatus according to claim 1, wherein the buffer unit moves the substrate supporting unit upward away from the conveying unit in the vertical direction using a cylindrical actuator.

3. The apparatus according to claim 1, further comprising a moving member associated with at least one of the processing units and configured to move the substrate between the substrate supporting unit, the conveying unit, at least one of the processing units, the buffer unit or any combination including at least one of the foregoing.

4. The apparatus according to claim 3, wherein the moving member comprises a fork configured to support the substrate during movement of the substrate.

5. The apparatus according to claim 1, wherein the body part comprises aluminum, stainless steel or any combination including at least one of the foregoing.

6. The apparats according to claim 1, wherein the substrate supporting part comprises a plastic.

7. The apparatus according to claim 1, wherein the substrate supporting part comprises a polycarbon resin, a polyetheretherketon (PEEK), or any combination including at least one of the foregoing.

8. The apparatus according to claim 1, further comprising rollers configured to support the substrate supporting unit as the substrate supporting unit is conveyed to the plurality of processing units.

9. The apparatus according to claim 1, wherein the buffer unit comprises a supporting member configured to support the substrate supporting unit during storage of the substrate supporting unit.

10. The apparatus according to claim 9, wherein the supporting member comprises a hinged support configured to allow the substrate supporting unit to move past the hinged support thereby allowing the substrate supporting unit to be stored in and removed from the buffer unit.

11. The apparatus according to claim 9, wherein the supporting member comprises a pneumatic pump, a guide spring or any combination including at least one of the foregoing.

12. The apparatus according to claim 1, further comprising a space defined between the supported substrate and the body part, wherein a moving member enters the apace to allow the substrate to be raised from the substrate supporting unit.

13. A method of conveying a substrate for processing, to method comprising
loading the substrate onto a first substrate supporting unit comprising a substrate supporting part comprising a plurality of projections configured to support a lower surface of the substrate thereon and a body part configured to prevent movement of the substrate from the substrate supporting unit, and configured to support thereon a second substrate supporting unit when a plurality of substrate supporting units are sequentially stored in a buffer unit;
conveying the first substrate supporting unit to a processing unit by a conveying unit; and
moving the substrate between the processing unit and the first substrate supporting unit.

14. The method according to claim 13, further comprising storing the first substrate supporting unit, the second substrate unit or both in the buffer unit configured to move and store the first substrate supporting unit, the second substrate unit or both away from the conveying unit.

15. The method according to claim 13, wherein the conveying the first substrate supporting unit comprises stopping the first substrate supporting unit at the processing unit during processing of the substrate at the processing unit.

16. The method according to claim 13, wherein the conveying the first substrate supporting unit comprises rollers supporting the first substrate supporting unit as it is conveyed to the processing unit.

17. The method according to claim 13, wherein the moving the substrate between the processing unit and the first substrate supporting unit comprises removing the substrate from and returning the substrate to the first substrate supporting unit positioned at the conveying unit, stored in the buffer unit or both.

18. The method according to claim 13, wherein the moving the substrate between the processing unit and the first substrate supporting unit comprises a robot configured to support the substrate while being moved.

* * * * *